United States Patent
Singh

(10) Patent No.: US 8,732,744 B2
(45) Date of Patent: *May 20, 2014

(54) METHODS, SYSTEMS, AND COMPUTER PROGRAM PRODUCTS FOR PRESENTING A MESSAGE ON A DISPLAY BASED ON A TYPE OF VIDEO IMAGE DATA FOR PRESENTATION ON THE DISPLAY

(75) Inventor: Mona Singh, Cary, NC (US)

(73) Assignee: Scenera Technologies, LLC, Portsmouth, NH (US)

(*) Notice: Subject to any disclaimer, the term of this patent is extended or adjusted under 35 U.S.C. 154(b) by 337 days.

This patent is subject to a terminal disclaimer.

(21) Appl. No.: 13/105,348

(22) Filed: May 11, 2011

(65) Prior Publication Data

US 2011/0210981 A1 Sep. 1, 2011

Related U.S. Application Data

(63) Continuation of application No. 11/528,072, filed on Sep. 27, 2006, now Pat. No. 7,962,932.

(51) Int. Cl.
*H04N 7/10* (2006.01)
*H04N 7/025* (2006.01)
*H04N 7/18* (2006.01)
*G08B 23/00* (2006.01)
*G08B 1/00* (2006.01)
*G08B 1/08* (2006.01)

(52) U.S. Cl.
USPC .......... 725/32; 725/33; 725/74; 725/78; 340/500; 340/531; 340/539.1

(58) Field of Classification Search
USPC .......... 725/32–36, 40, 42, 58; 348/409.1, 348/415.1; 340/500, 531, 539.1
See application file for complete search history.

(56) References Cited

U.S. PATENT DOCUMENTS

| | | |
|---|---|---|
| 5,134,484 A | 7/1992 | Willson |
| 6,005,643 A | 12/1999 | Morimoto et al. |
| 6,226,041 B1 | 5/2001 | Florencio et al. |
| 6,373,530 B1 | 4/2002 | Birks et al. |
| 6,553,150 B1 | 4/2003 | Wee et al. |
| 6,594,311 B1 | 7/2003 | Perlstein |
| 6,870,573 B2 | 3/2005 | Yeo et al. |
| 6,970,510 B1 | 11/2005 | Wee et al. |
| 7,342,488 B2* | 3/2008 | Wolfe et al. ............ 340/500 |
| 7,768,388 B2* | 8/2010 | Putterman et al. ........ 340/531 |
| 2003/0061615 A1* | 3/2003 | Van Der Meulen ........ 725/74 |
| 2004/0190611 A1 | 9/2004 | Nakajima |

OTHER PUBLICATIONS

Wee, et al., "Compressed-Domain Video Processing," Hewlett-Packard Company, Copyright 2002, 35 pages.

* cited by examiner

*Primary Examiner* — Hai V Tran

(57) ABSTRACT

Methods, systems, and computer program products for a message on a display based on a type of video image data for presentation on the display are described. An indication of one of a plurality of priority levels associated with a message for presentation on a display is received. Whether a type of a video image data for presentation on the display has a predetermined relationship to the priority level of the message is determined. The message is presented on the display based on the video image data type determination.

28 Claims, 3 Drawing Sheets

METHODS, SYSTEMS, AND COMPUTER PROGRAM PRODUCTS FOR PRESENTING A MESSAGE ON A DISPLAY BASED ON A TYPE OF VIDEO IMAGE DATA FOR PRESENTATION ON THE DISPLAY

RELATED APPLICATIONS

This application is a continuation of U.S. Pat. No. 7,962,932 titled "METHODS, SYSTEMS, AND COMPUTER PROGRAM PRODUCTS FOR PRESENTING A MESSAGE ON A DISPLAY BASED ON VIDEO FRAME TYPES PRESENTED ON THE DISPLAY", filed on Sep. 27, 2006, the entire disclosure of which is here incorporated by reference.

TECHNICAL FIELD

The subject matter described herein relates to presenting messages on a display. More particularly, the subject matter described herein relates to methods, systems, and computer program products for presenting messages on a display based on a type of video image data presented on the display.

BACKGROUND

Devices are becoming increasingly networked together for exchanging data, messages, video, and audio. For example, many households include wireless and/or wired local area networks for exchanging information among local devices. Exemplary devices that may be connected in a network environment include computers, mobile phones, personal digital assistants (PDAs), home appliances (e.g., washing machines, dishwashers, hot water heaters, ovens, and stoves), and security alarm devices.

One advantage of networking devices is that a user located at a networked device may receive messages communicated from other devices connected to the network. For example, a networked device may generate a message and communicate the message to the network for receipt by the device where the user is located. The message may be presented to the user on a display, such as a computer display or a television. In one example, the message may be presented on a display in a pop-up window. As a result, a user may be notified of messages from networked devices on a display.

One difficulty with presenting a message on a display is that video being presented on the display may be interrupted. For example, a message may interrupt presentation of a television program or movie on a display. As a result, a user may disable the presentation of all messages on the display due to continuous interruptions. The disabling of all messages is undesirable because the user may not be able to otherwise receive important messages such as messages related to security alarm devices and warnings with respect to appliances.

Accordingly, in light of the above described difficulties and needs, there exists a need for improved methods, systems, and computer program products for presenting messages on a display.

SUMMARY

According to one aspect, methods, systems, and computer program products for presenting a message on a display based on a type of video image data for presentation on the display are described. An indication of one of a plurality of priority levels associated with a message for presentation on a display is received. Whether a type of a video image data for presentation on the display has a predetermined relationship to the priority level of the message is determined. The message is presented on the display based on the video image data type determination.

As used herein, the term "message" refers to any suitable message for presentation on a display. The message may include text and/or one or more images for conveying information to a user of the display. Further, the message may be in a format suitable for presentation on the display with a video frame. Exemplary information that may be included in a message includes status information, alert information, reminder information, warning information, and calendar information.

As used herein, the term "video frame" refers to image data for use by a system for presenting one or more images on a display. A set of video frames may be communicated in sequence to a display for presenting video to a user. Video frames may be compressed in video compression formats such as in accordance with one of the International Telecommunication Union (ITU) video standards (such as ITU-T) or one of the Moving Picture Experts Group (MPEG) video standards (such as MPEG-1, MPEG-2, MPEG-3, or MPEG-4). Exemplary video frame types include intra-frames (I-frames), predicted frames (P-frames), and bi-directional or b-predictive frames (B-frames).

As used herein, the term "display" refers to any device suitable for displaying a video frame or a sequence of video frames. Further, the display may be operable to display a video frame with a message. Exemplary displays include a television and a computer display or monitor.

The subject matter described herein may be implemented using a computer program product comprising computer executable instructions embodied in a computer-readable medium. Exemplary computer-readable media suitable for implementing the subject matter described herein include chip memory devices, disk memory devices, programmable logic devices, application specific integrated circuits, and downloadable electrical signals. In addition, a computer-readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
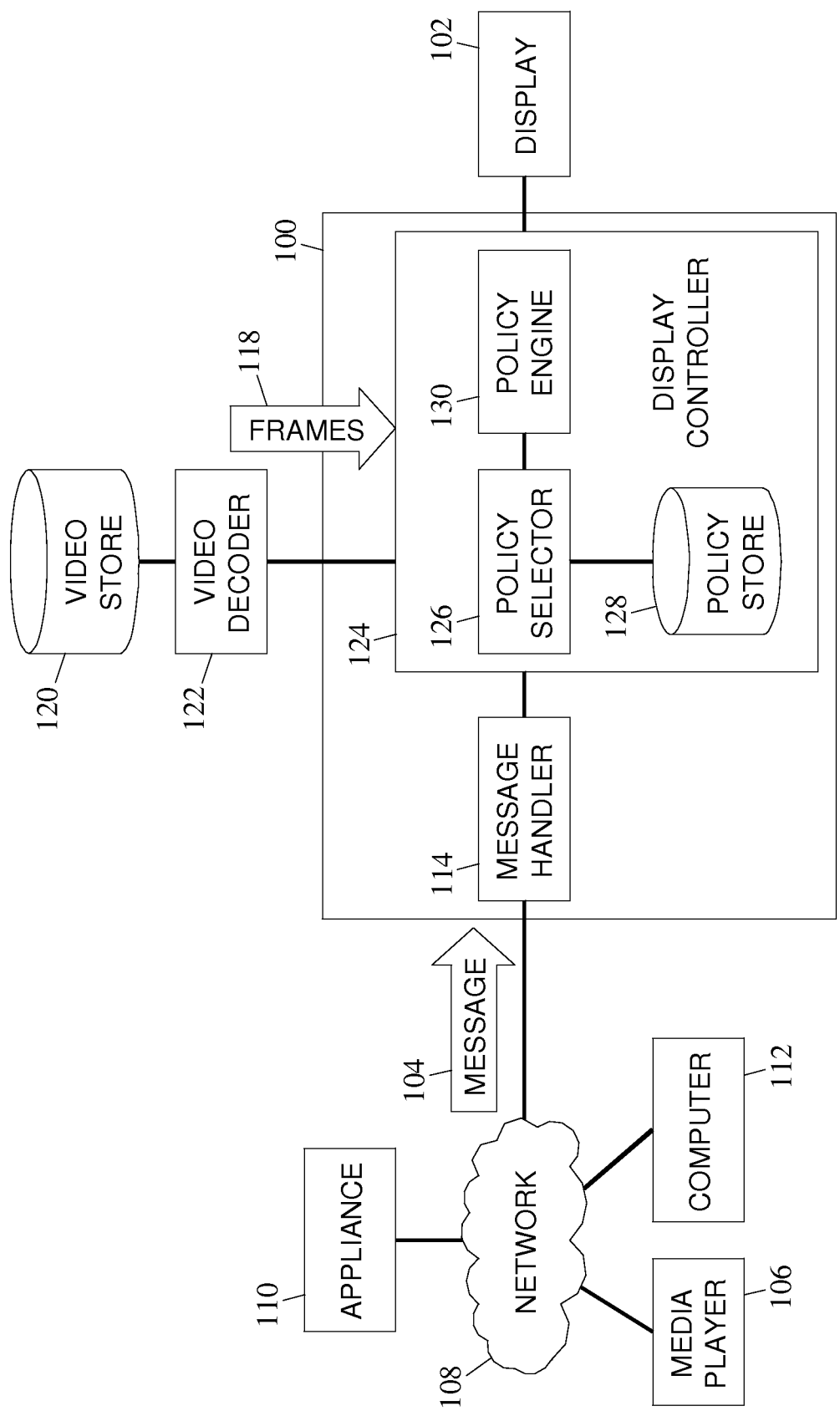
FIG. 1 is a block diagram of an exemplary system for presenting a message on a display based on video frame types presented on the display according to the subject matter described herein.

The subject matter described herein includes methods, systems, and computer program products for presenting a message on a display based on video frame types presented on the display. According to one aspect, a system according to the subject matter described herein may be implemented as hardware, software, and/or firmware components executing on one or more components of a system configured to present video and messages on a display. FIG. 1 is a block diagram of an exemplary system 100 for presenting a message on a display based on video frame types presented on the display according to the subject matter described herein. Referring to FIG. 1, system 100 may receive messages and video frames for presentation on a display 102. For example, system 100 may receive a message 104 from a media player 106 via a network 108. In another example, system 100 may receive a message from an appliance 110. In another example, system 100 may receive a message from a computer 112. Other exemplary devices for communicating messages to system 100 include a phone such as a mobile phone, a PDA, a washing machine, a kitchen appliance, a network component, a security alarm device, and any other suitable electronic device.

The received messages may be associated with one of a plurality of priority levels. System 100 may include means for receiving a message having one of a plurality of priority levels for presentation on a display. For example, a message handler 114 of system 100 may be configured to receive messages having one of a plurality of priority levels for presentation on display 102. As described further herein, the priority level of a message may be indicated by information contained in the message, indicated by a device communicating the message, and combinations thereof. Message handler 114 may be configured to check that a received message is complete and that the source of the message is valid. Further, message handler 114 may be configured to store received messages and/or forward complete and valid messages to a display controller 116 for further processing and/or storage.

System 100 may be configured to receive video frames for presentation on a display 102. For example, video frames 118 may be communicated to system 100 by a video store 120 and a video decoder 122. Video store 120 may be configured to store video frames. Video decoder 122 may be configured to suitably decode the video frames for presentation on display 102. Video frames 118 may be received in a sequence for presentation on display 102 in a video stream. Further, system 100 may be configured to manage and store video frames 118 and control display 102 for presentation of video frames 118 on display 102. As described further herein, the received video frames 118 may be associated with different frame types.

As set forth above, video frames 118 may be communicated in one of a plurality of different types for data compression purposes. For example, video frames 118 may be encoded in video compression formats, such as in ITU-T or MPEG video formats, where only the difference between successive frames is encoded. For instance, in a scene in which a person walks past a stationary background, only the moving region will need to be represented. The moving region may be represented by motion vectors, image data, or a combination thereof. The parts of the scene that are not changing do not need to be sent repeatedly.

In one embodiment, video frame types include I-frames, P-frames, and B-frames. Typically, video frames are segmented into macroblocks. Individual prediction types may be selected on a macroblock basis rather than being the same for the entire picture as follows: I-frames may contain only intra macroblocks; P-frames may contain only intra macroblocks or predicted macroblocks; and B-frames may contain intra, predicted, or bi-predicted macroblocks. Further, for example, in video codec standard H.264, the frame may be segmented into smaller regions, referred to as slices, and rather than using I-, B-, and P-frame type selections. An encoder may select the prediction style based on each individual slice.

The term "picture" as referred to herein is a more general term than the term "frame". A picture may be either a frame or a field. A frame is an image captured at some instant in time and a field is a set of every other line that form an image at some instant in time. When sending video in interlaced-scan format, the coding of pictures as individual fields is often used rather than coding of complete frames.

An I-frame (an intra picture or slice) is a frame coded without reference to another frame other than itself. An I-frame may be generated by an encoder to create a random access point for allowing a decoder to start decoding properly at the frame. Further, an I-frame may be generated when differentiating image details prohibits the generation of effective P- or B-frames. Often, I-frames are used for random access and as references for the decoding of other pictures. Intra refresh periods of a half-second may be used on applications such as digital television broadcast and DVD storage. Longer refresh periods may be used in applications such as videoconferencing.

A P-frame (a predicted picture or slice) is a frame requiring prior decoding of some other picture(s) in order to be decoded. A P-frame may contain image data, motion vector displacements, or combinations thereof. Further, a P-frame may reference previous pictures in decoding order. In some standards, such as MPEG-2, only one previously-decoded picture is used as a reference during decoding. These standards require that the picture precedes the P-picture in presentation sequence. In standard H.264, multiple previously-decoded pictures may be referenced during decoding. In this standard, any arbitrary presentation order relationship with respect to the picture may be used for its prediction.

A B-frame (a bi-predictive picture or slice) is a frame requiring prior decoding of some other picture(s) in order to be decoded. A B-frame may contain image data, motion vector displacements, or combinations thereof. Further, a bi-frame may include some prediction modes that form a prediction of a motion region (e.g., a macroblock or a smaller area) by averaging the predictions obtained using two different previously-decoded reference regions. In some standards, such as MPEG-2, B-pictures are not used as references for the prediction of other pictures. As a result, a lower quality encoding can be used for such B-pictures because the loss of detail does not harm the prediction quality for a subsequent picture. In standard H.264, a B-frame may be used as a reference for decoding other pictures. Further, in the MPEG-2 standard, two previously-decoded pictures may be used as reference during decoding. One of the previously-decoded pictures is required to precede the B-picture in the presentation sequence, while the other of the previously-decoded pictures is required to follow the B-picture. In H.264, one or more previously-decoded pictures may be used as references during decoding. Further, the previously-decoded picture(s) can be in any sequence order with respect to the B-picture.

System 100 may include means for determining whether a type of a video frame for presentation on a display has a predetermined relationship to a priority level of a message. For example, a policy selector 126 of a display controller 124 may determine whether a type of a video frame for presentation on display 102 has a predetermined relationship to a priority level of message 104. Policy selector 126 may be configured to receive messages and information indicating their priority levels.

Table 1 below shows exemplary messages and associated priority levels.

TABLE 1

Exemplary Messages and Associated Priority Levels

| Message | Message Priority Level |
|---|---|
| "Catching fire, please turn off" | 1 |
| "Water overflowing" | 2 |
| "Load unbalanced" | 3 |
| "No water" | 4 |
| "Cycle complete" | 5 |
| "Battery running low" | 3 |
| "Requested songs available" | 4 |
| "Downloads complete" | 5 |

The exemplary messages shown in Table 1 are messages that may be received from a washing machine and a media player (such as the IPOD™ media player, available from Apple Computer, Inc., of Cupertino, Calif.). The messages including the text "Catching fire, please turn off," "Water overflowing," "Load unbalanced," "No water," and "Cycle complete" may be received from a washing machine. The messages including the text "Battery running low," "Requested songs available," and "Downloads complete" may be received from a media player. The priority levels can range from 1 to 5 with priority level 1 being the highest priority level and priority level 5 being the lowest priority level. In one example, message handler 114 may determine a priority level of a message based on the message's text by performing a lookup in a table such as Table 1.

Policy selector 126 may be configured to determine whether a type of video frame for presentation on a display has a predetermined relationship to a priority level of a message based on a predetermined set of policies. The set of policies may be stored in a policy store 128. Policies may be defined in terms of video frame types. Policies corresponding to priority levels may include duration specifications and/or individual frame specifications. Further, policies may be applied based on a type of frame available for presentation on the display.

Table 2 below shows exemplary policies applied to messages based on the priority levels of the messages.

TABLE 2

Exemplary Policies Applied to Messages

| Message Priority Level | Policy (English Language Description) | Frame Specification | Duration |
|---|---|---|---|
| 1 | Present on display with first incoming frame (I-frame, P-frame, or B-frame) for 30 seconds irrespective of all following frames | First available | 30 seconds |
| 2 | Present on display prior to presenting an I-frame for 30 seconds | I-frame | 30 seconds |
| 3 | Present on display with 30 frames preceding an I-frame | Not I-frames | 30 frames |

The exemplary message priority levels shown in Table 2 are priority levels associated with policies for presenting messages on a display. Messages having priority level 1 are presented on a display with a first incoming frame and subsequent frames for a predetermined time duration of 30 seconds irrespective of the frames following the first incoming frame. In this example, the first incoming frame and the following frames may be an I-frame, a P-frame, or a B-frame. Messages having priority level 2 are presented on a display prior to presenting an I-frame for 30 seconds. Messages having priority level 3 are presented on a display with a predetermined number of frames (30 frames) preceding the presentation of an I-frame.

Policy selector 126 may use a priority level of a received message for searching policy store 128 for a policy corresponding to the priority level. The message and its corresponding priority level and the policy may be communicated to a policy engine 130 for use in associating one or more incoming video frames with the message. For example, message 104 and its corresponding priority level and policy may be communicated to policy engine 130. Policy selector 126 may determine whether a type of a video frame has a predetermined relationship to the priority level of a message by comparing the priority level of the message to types of a plurality of video frames.

System 100 may include means for presenting a received message on a display based on a video frame type determination. For example, policy engine 130 may be configured to control display 102 to present message 104 based on a video frame type determination of frames 118. In particular, the policy for a received message and the frames types determined for received message may be used for determining which frame or frames to present the message with on display 102. Display 102 is operable to present frames and messages to an operator in accordance with control commands provided by display controller 124. Policy engine 130 may track received video frames and video frames sent to display 102. Further, policy engine 130 may modify video frames to include messages and send the modified video frames to display 102 for presentation. Thus, policy engine 130 is responsible for application of policies to the presentation of video frames and messages.

Figure 2:
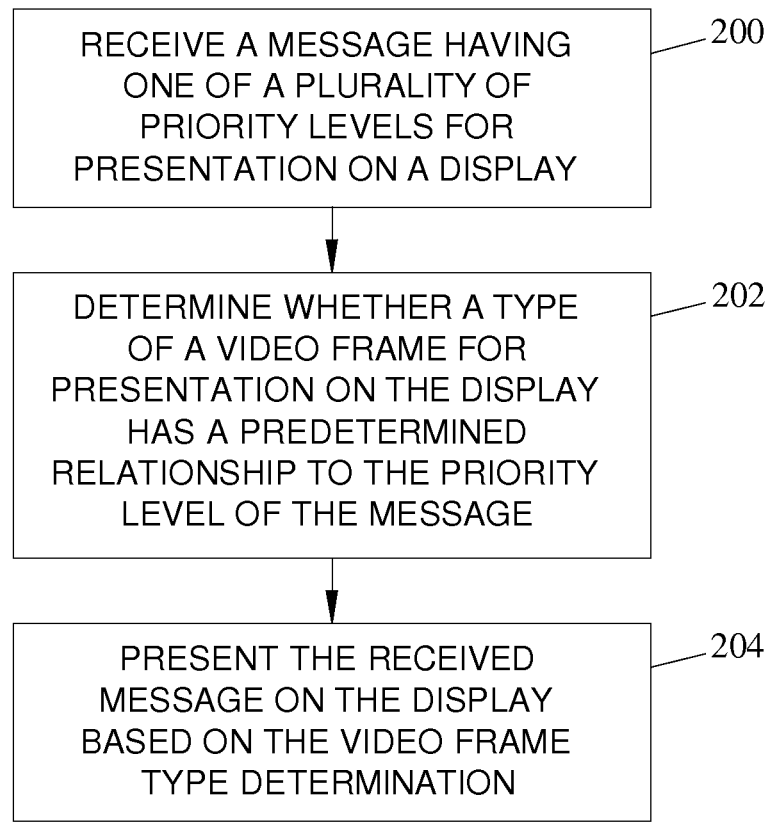
FIG. 2 is a flow chart of an exemplary process for presenting a message on a display based on video frame types presented on the display according to an embodiment of the subject matter described herein.

FIG. 2 is a flow chart illustrating an exemplary process for presenting a message on a display based on video frame types presented on the display according to an embodiment of the subject matter described herein. Referring to FIG. 2, in block 200 the process provides for receiving a message having one of a plurality of priority levels for presentation on a display. For example, a process associated with system 100 may receive message 104 for presentation on display 102. In this example, message 104 may have a priority level of 3 as shown in Table 2 above. In block 202, it may be determined whether a type of a video frame for presentation on the display has a predetermined relationship to the priority level of the message. For example, display controller 124 may receive message 114 and its determined priority level from message handler 114 and may receive video frames 118 from video decoder 122 for presentation on display 102. In this example, display controller 124 may determine whether a type of at least one of video frames 118 has a predetermined relationship to the priority level of message 104. In block 204, the received message may be presented on the display based on the video frame type determination. For example, display controller 124 may control display 102 to present message 104 at least substantially simultaneously with one or more of frames 118 based on the video type determination.

Figure 3:
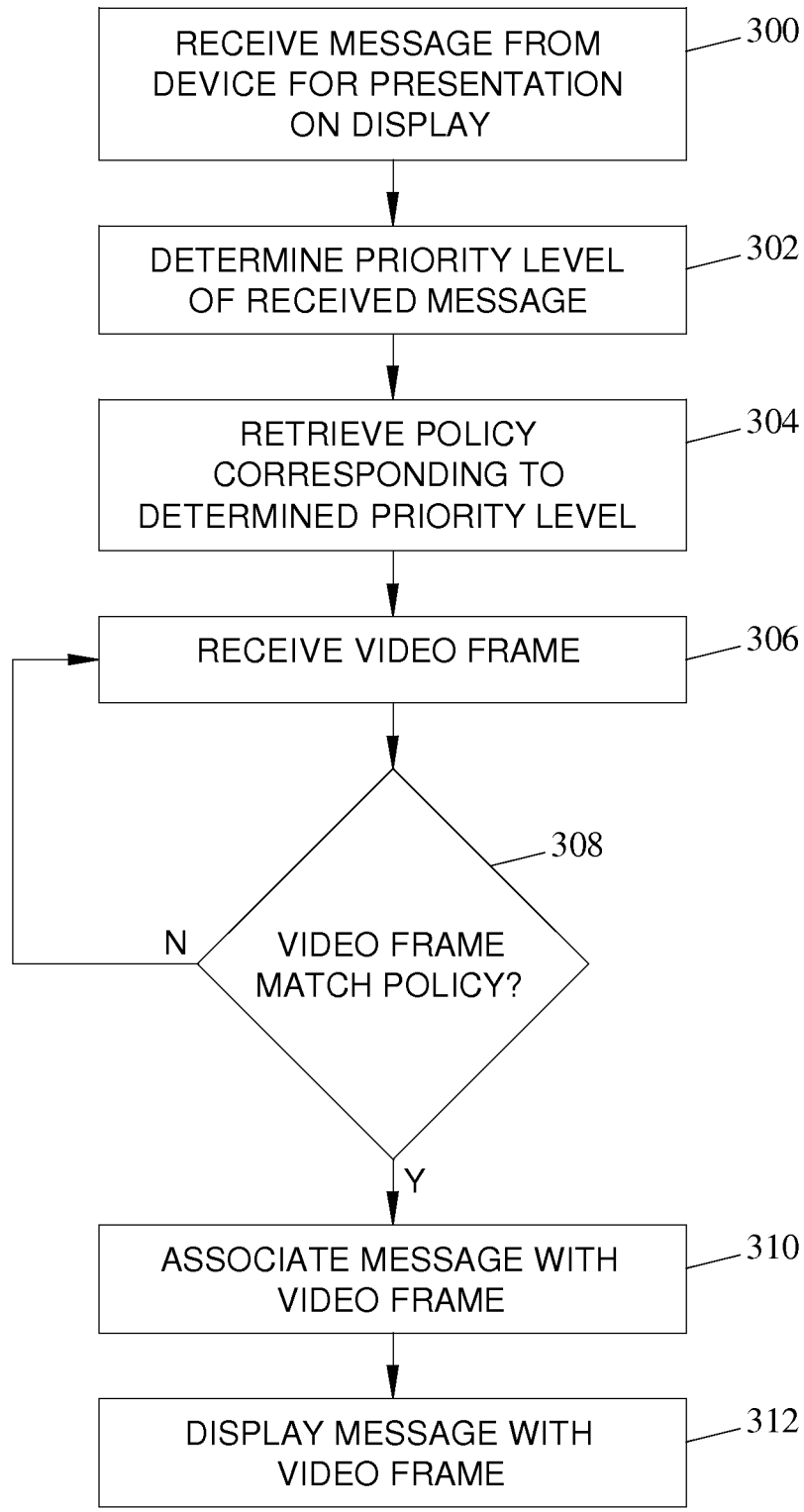
FIG. 3 is a flow chart illustrating an exemplary process for use by the system shown in FIG. 1 for presenting a message on a display based on a video frame types presented on the display according to an embodiment of the subject matter described herein.

FIG. 3 is a flow chart illustrating an exemplary process for use by system 100 shown in FIG. 1 for presenting a message on a display based on video frame types presented on the display according to an embodiment of the subject matter described herein. Referring to FIG. 3, in block 300 message 104 may be received by message handler 114 of system 100 from one of media player 106, appliance 110, and computer 112 for presentation on display 102. Other exemplary devices that may communicate messages to system 100 include a phone (such as a mobile phone), a PDA, any suitable electronic device, a network component, and a security alarm device. Exemplary messages may include information such as status information, alert information, reminder information, warning information, and calendar information. Messages may be communicated to system 100 via network 108 by using any suitable network communication technique.

In block 302, message handler 114 may determine a priority level of message 104. The priority level of message 104 may be determined by examining message 104. For example, message 104 may indicate its priority level. In this example, message handler 114 may determine the priority level based on the indication by message 104.

In one example, message handler 114 may determine the priority level based on the text of message 104. In this example, message handler 114 may determine the priority level by parsing the text of the message, such as shown in the message text and associated priority levels shown in Table 1 above.

In one example, message handler 114 may determine the priority level based on a message type of message 104. In this example, message handler 114 may determine the priority level based on message types such as whether the message is status type message, an alert type message, a reminder type message, a warning type message, and a calendar type message. Priority levels may be associated with a message based on its type. For example, a warning type message may have a higher priority level than a calendar type message.

In one example, message handler 114 may determine the priority level of message 104 based on the device communicating or originating message 104. In this example, a message received from a security alarm device may have a higher priority than a message received from a media player or home appliance.

In another example, the priority level of message 104 for use in determining whether a type of video frame for presentation on a display may be determined based on a combination of the device communicating or originating message 104 and the text of message 104 or a priority level indicated by message 104. Table 3 below shows exemplary priority levels based on a message and a device originating or communicating the message.

TABLE 3

Exemplary Priority Levels Based on a Message and Device

| Device | Message | Message priority level |
|---|---|---|
| Washer | "Catching fire, please turn off" | Device priority: 2+<br>Message priority: 1<br>Message priority level: 1.5 |
| Dryer | "Clothes dry" | Device priority: 3+<br>Message priority: 2<br>Message priority level: 2.5 |
| Washer | "Water overflowing" | Device priority: 2+<br>Message priority: 1<br>Message priority level: 1.5 |
| Washer | "No water" | Device priority: 2+<br>Message priority: 2<br>Message priority level: 2 |
| Washer | "Cycle complete" | Device priority: 2+<br>Message priority: 3<br>Message priority level: 2.5 |
| Security Alarm | "Window open" | Device priority: 1+<br>Message priority: 1<br>Message priority level: 1 |

The exemplary message priority levels for use in determining whether a type of video frame for presentation on a display may be determined based on the contents or a priority level indicated by a message and a device originating the message. In this example, the device priority level and the message priority level are averaged for resulting in a message priority level for use in determining whether a type of video frame for presentation on a display.

In block 304, policy selector 126 may retrieve a policy from policy store 128 corresponding to the determined priority level of message 104. For example, policy selector 126 may retrieve one of the policies as shown in Table 2 above based on the determined priority level of 1-3 of message 104.

In block 306, policy engine 130 may receive a decoded video frame 118 from video decoder 122. Video frames 118 may be received from video decoder 122 in a sequence for presentation on display 102. The types of received video frames 118 may be compared one-by-one in sequence to determine whether each video frame matches a policy for message 104 (block 308). If a received video frame does not match the policy, the next video frame in the sequence is received and compared to the policy in blocks 306 and 308 until a matching video frame is received.

When a matching video frame is received, message 104 is associated with the matching video frame in accordance with the policy for presentation on display 102 (block 310). Further, message 104 may also be matched with one or more other video frames in accordance with the policy. For example, a policy may require presenting a message on a display with 30 frames preceding an I-frame. In this example, a set of frames are matched against the policy for identifying 30 frames preceding an I-frame. Further, in this example, the message is associated with the identified 30 frames for presentation on display 102.

In block 312, message 104 may be presented on display 102 with the one or more associated video frames 118. Policy engine 130 may communicate message 104 and the one or more video frames 118 to display 102 and control display 102 to present message 104 and the one or more video frames 118. Message 104 may be presented with a video frame on display 102 in accordance with any suitable insertion technique. In one example, a buffer may be set during decoding for managing the presentation of a message and video frame. In another example, a message may be inserted in a video frame presented on a digital television without decoding the entire frame, as described in the document found at Internet URL http://www.digitaltelevision.com/dtvbook/appendixa.shtml.

In one embodiment, a user may interact with a message presented on a display. For example, a user may input commands with interaction functionality of a digital television in response to a message being presented. Further, presented messages may require interaction from a user. For instance, a message received from a toaster oven may require input from a user such as the user selecting an OK button presented on the display. If a user does not provide input, a system may communicate the message to another display for presentation of the message to a user.

In one embodiment, a policy associated with a message may include performing an action in addition to presenting the message on the display. In particular, the policy may include performing a display control function. An exemplary display control function may include pausing the display of video frames for a period of time. For example, a message may be received from a toaster oven indicating that the toaster oven should be turned off or the oven will catch on fire. In this example, the message may be presented on the display, and the presentation of video frames on the display may be paused until the user interacts with the message. Once the user has taken the appropriate action in response to the message such as selecting an OK button, the presentation of the video frame stream on the display may continue. Alternatively, display control functions may expire at the end of a time duration in which the user has not responded. An operator interface may be configured to allow the user to interact with the message.

Table 4 below shows an exemplary policy applied to a message having a priority level of 1.

TABLE 4

Exemplary Policy Applied Priority Level 1 Message

| Message Priority Level | Policy (English Language Description) | Frame Specification | Duration | Action |
|---|---|---|---|---|
| 1 | Pause the display before an I-frame for 10 seconds | Frame preceding the I-frame | 10 seconds | Pause |

In this example, the policy requires pausing a display before an I-frame for 10 seconds for a message having a priority level of 1. The message may be presented on the display with a frame of any type that precedes an I-frame. The frame preceding the I-frame and the message may be presented on the display for 10 seconds. Next, the I-frame may be presented and followed by other frames in sequence.

In one embodiment, a policy may include specifications for properties of several video frames. For example, a policy may specify that a message be presented only when there are a predetermined number of video frames of a particular type. In this policy scenario, video frames may be buffered in order to find a set of video frames in sequence that match the policy. When the predetermined number of sequenced video frames are found, the message may be presented with the video frames.

In one embodiment, two or more messages may be simultaneously presented with a video frame. A plurality of messages that each has one of a plurality of priority levels may be received. It may be determined whether the type of a video frame has a predetermined relationship to the priority levels of the messages. Further, the received messages may be presented with the video frame on the display based on the video frame type determination. Further, the messages may be presented with individual portions of the video frame based on the priority levels of the messages. For example, a first message with a higher priority than a second message may be displayed in the bottom right of a display screen, while the second message is displayed at the bottom left of a display screen. The messages may be inserted in a video frame of a type specified by the policy.

In one embodiment, one of a plurality of display properties of a display may be associated with a priority level of a received message. The received message may be presented on the display in accordance with one of the plurality of display properties. The display property used for presenting the message may be based upon a priority level of the message and/or a type of frame with which the frame is being presented. Exemplary display properties include text font, text size, text color, message transparency, fade in, and fade out.

The subject matter described herein may be advantageous, for example, in applications for managing the presentation of message content on a display. In particular, the subject matter described herein may determine a priority level of received messages and control the presentation of the messages with video frames based on priority levels associated with the messages. This feature may be advantageous to a display user, for example, because messages of a high priority level that are more important to a user may be presented on a display in a way that is different than less important messages of a low priority level. As a result, users will be more likely to read messages that are important and less likely to be distracted by messages that are less important. Further, a user may be less likely to disable the display of messages, because priority levels of messages are distinguished for presenting messages of different priorities in different ways.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for presenting a message on a display based on a type of video image data for presentation on the display, the method comprising:
   receiving an indication of one of a plurality of priority levels associated with a message for presentation on a display;
   determining whether a type of a video image data for presentation on the display has a predetermined relationship to the priority level of the message; and
   presenting the message on the display based on the video image data type determination.

2. The method of claim 1 wherein the video image data is at least one of a slice, a field, and a macroblock.

3. The method of claim 1 wherein the message includes information selected from the group consisting of status information, alert information, reminder information, warning information, and calendar information.

4. The method of claim 1 wherein determining whether a type of a video image data for presentation on the display has a predetermined relationship to the priority level of the message includes comparing the priority level of the message to types of a plurality of video image data.

5. The method of claim 4 wherein presenting the message on the display includes presenting the message on the display substantially simultaneously with at least one of the plurality of video image data based on the comparison of the priority level of the message to the types of the plurality of video image data.

6. The method of claim 1 wherein presenting the message on the display includes presenting the message on the display based on a policy associated with the priority level of the message.

7. The method of claim 1 wherein presenting the message on the display includes presenting the message on the display for a predetermined time period.

8. The method of claim 1 wherein the video image data is among a plurality of video image data for presentation on the display, and wherein presenting the message on the display includes presenting the message on the display with at least one of the plurality of video image data at a sequence interval with respect to the video image data.

9. The method of claim 1 wherein presenting the message on the display includes presenting the message on the display at a time interval with respect to presentation of the video frame on the display.

10. The method of claim 1 comprising:
receiving the message;
determining a type of an electronic-based device originating the message; and
determining a priority level of the message based on the determined type of the electronic-based device.

11. The method of claim 1 comprising:
determining a message type of the message; and
determining a priority level of the message based on the determined message type.

12. The method of claim 1 comprising performing a display control function based on the priority level of the message.

13. The method of claim 1 comprising associating a display property with the priority level of the message, and wherein presenting the message on the display includes presenting the message on the display in accordance with the display property.

14. A system for presenting a message on a display based on a type of video image data for presentation on the display, the system comprising:
a message handler configured to receive an indication of one of a plurality of priority levels associated with a message for presentation on a display; and
a display controller configured to determine whether a type of a video image data for presentation on the display has a predetermined relationship to the priority level of the message and configured to control the display to present the message on the display based on the video image data type determination.

15. The system of claim 14 wherein the video image data is at least one of a slice, a field, and a macroblock.

16. The system of claim 14 wherein the message includes information selected from the group consisting of status information, alert information, reminder information, warning information, and calendar information.

17. The system of claim 14 wherein the display controller is configured to compare the priority level of the message to types of a plurality of video image data.

18. The system of claim 17 wherein the display controller is configured to control the display to present the message substantially simultaneously with at least one of the plurality of video image data based on the comparison of the priority level of the message to the types of the plurality of video image data.

19. The system of claim 14 wherein the display controller is configured to control the display to present the message based on a policy associated with the priority level of the message.

20. The system of claim 14 wherein the display controller is configured to control the display to present the message for a predetermined time period.

21. The system of claim 14 wherein the video image data is among a plurality of video image data for presentation on the display, and wherein the display controller is configured to control the display to present the message with at least one of the plurality of video image data at a sequence interval with respect to the video image data.

22. The system of claim 14 wherein the display controller is configured to control the display to present the message at a time interval with respect to presentation of the video image data on the display.

23. The system of claim 14 wherein the message handler is configured to determine a type of an electronic-based device originating the message; and wherein the display controller is configured to determine a priority level of the message based on the determined type of the electronic-based device.

24. The system of claim 23 wherein message indicates a type of an electronic-based device, and wherein the display controller is configured to determine the priority level of the message based on the type of the electronic-based device indicated by the message.

25. The system of claim 14 wherein the display controller is configured to perform a display control function based on the priority level of the message.

26. The system of claim 14 wherein the display controller is configured to control the presentation of a stream of video image data on the display based on the priority level of the message.

27. The system of claim 14 wherein the display controller is configured to associate a display property with the priority level of the message, and wherein the display controller is configured to control the display to present the message on the display in accordance with the display property.

28. A non-transitory computer readable medium storing a computer program, executable by a machine, for presenting a message on a display based on a type of video image data for presentation on the display, the computer program comprising executable instructions for:
receiving an indication of one of a plurality of priority levels associated with a message for presentation on a display;
determining whether a type of a video image data for presentation on the display has a predetermined relationship to the priority level of the message; and
presenting the message on the display based on the video image data type determination.

* * * * *